(12) United States Patent
Smaoui et al.

(10) Patent No.: US 10,298,097 B2
(45) Date of Patent: May 21, 2019

(54) ELECTRICAL MACHINE WITH SUPERCONDUCTING COILS

(71) Applicant: EUROPEAN AERONAUTIC DEFENCE AND SPACE COMPANY EADS FRANCE, Paris (FR)

(72) Inventors: Hichem Smaoui, Paris (FR); Charles Nespoulous, Saint-Cloud (FR); Bruno Rechain, Paris (FR); Emmanuel Joubert, Issy les Moulineaux (FR)

(73) Assignee: AIRBUS, Blagnac (FR)

( * ) Notice: Subject to any disclaimer, the term of this patent is extended or adjusted under 35 U.S.C. 154(b) by 872 days.

(21) Appl. No.: 14/654,274

(22) PCT Filed: Dec. 18, 2013

(86) PCT No.: PCT/EP2013/077104
§ 371 (c)(1),
(2) Date: Sep. 28, 2015

(87) PCT Pub. No.: WO2014/096011
PCT Pub. Date: Jun. 26, 2014

(65) Prior Publication Data
US 2016/0020674 A1    Jan. 21, 2016

(30) Foreign Application Priority Data

Dec. 20, 2012 (FR) ..................... 12 62478

(51) Int. Cl.
*H02K 9/19* (2006.01)
*H02K 9/20* (2006.01)
*H02K 55/00* (2006.01)

(52) U.S. Cl.
CPC ............. *H02K 9/19* (2013.01); *H02K 9/20* (2013.01); *H02K 55/00* (2013.01); *Y02E 40/62* (2013.01)

(58) Field of Classification Search
CPC .. H02K 5/24; H02K 9/00; H02K 9/19; H02K 9/20; H02K 55/02; Y02E 40/62
(Continued)

(56) References Cited

U.S. PATENT DOCUMENTS 6,777,841 B2 *   8/2004   Steinmeyer ......... F16C 32/0438
                                                            310/90.5
7,061,147 B2 *   6/2006   Ries ....................... B63H 5/125
                                                            310/51

(Continued)

FOREIGN PATENT DOCUMENTS

DE     197 10 501 A1    1/1998
EP     1 777 800 A2     4/2007

OTHER PUBLICATIONS

Viatcheslav Dombrovski et al, "Design and Testing of a 1000-hp High-Temperature Superconducting Motor", IEEE Transactions on Energy Conversion, vol. 20, No. 3, Sep. 2005.*

(Continued)

*Primary Examiner* — John K Kim
(74) *Attorney, Agent, or Firm* — Im IP Law; C Andrew Im; Chai Im

(57) ABSTRACT

An electromechanical machine includes at least one coil made from a material that becomes electrically superconducting when its temperature is below a critical temperature. A functional part is contained in an internal volume of a thermally insulating and fluid-tight enclosure of the machine. A wall of the insulating enclosure is traversed in a fluid-tight fashion by at least one shaft for transmitting mechanical power between the functional part located in the internal volume of the insulating enclosure and a space outside the insulating enclosure. The functional part can be (Continued)

used as a heat sink, pre-cooled to maintain the temperature conditions for maintaining superconductivity inside the insulating enclosure.

15 Claims, 2 Drawing Sheets

(58) Field of Classification Search
USPC .......................................................... 310/54
See application file for complete search history.

(56) References Cited

U.S. PATENT DOCUMENTS

| | | | | |
|---|---|---|---|---|
| 7,211,921 B2* | 5/2007 | Frank | ....................... | H02K 5/04 |
| | | | | 310/261.1 |
| 8,063,520 B2* | 11/2011 | Frank | ..................... | H02K 55/04 |
| | | | | 310/261.1 |
| 2010/0164309 A1* | 7/2010 | Ohashi | ..................... | H02K 5/24 |
| | | | | 310/51 |
| 2012/0165198 A1* | 6/2012 | Mizutani | ................ | H02K 55/02 |
| | | | | 505/163 |
| 2016/0020674 A1* | 1/2016 | Smaoui | .................. | H02K 55/00 |
| | | | | 310/54 |

OTHER PUBLICATIONS

USPAS Cryogenics Short Course, Boston, MA Jun. 14 to Jun. 18, 2010.*

M. A. Green, "The Integration of Cryogenic Cooling Systems With Superconducting Electronic Systems", Lawrence Berkeley National Laboratory, Berkeley CA, USA, 2013.*

Strasser, "Magnetische Charakterisierung von schmelztexturierten YBa2Cu3O7-x-Hochtemperatur-Supraleitern," Dec. 31, 1999, pp. 66-69, Papierflieger, Clausthal-Zellerfeld.

* cited by examiner

ELECTRICAL MACHINE WITH SUPERCONDUCTING COILS

RELATED APPLICATIONS

This application is a § 371 application from PCT/EP2013/077104 filed Dec. 18, 2013, which claims priority from French Patent Application No. 12 62478 filed Dec. 20, 2012, each of which is herein incorporated by reference in its entirety.

TECHNICAL FIELD OF THE INVENTION

The present invention belongs to the field of electromechanical machines, motors, or generators whose coils are maintained at very low temperatures during operation.

More particularly, the invention relates to an electromechanical machine whose coil windings are maintained at temperatures low enough to enable these coils to function as superconductors.

BACKGROUND OF THE INVENTION

Electrical superconductivity is a well-known phenomenon that arises in certain materials and makes their electrical resistivity practically zero.

This property of certain materials is particularly advantageous because it results in the ability to produce windings for generating magnetic fields that can handle high electrical currents, as long as certain critical current densities are not exceeded, without joule heating and with smaller conductive sections, and thus lower coil masses.

However, in order to obtain this behavior of the material, it is necessary to maintain it at temperatures below a critical temperature that depends on the conductive material used, which temperatures may be cryogenic and near absolute zero, at least for certain modes of superconductivity.

This constraint resulted in the development of machines with superconducting coils limited to static applications, such as for example coils used in particle accelerators or magnetic resonance imaging devices, and more recently for storing energy in magnetic form, for which the continuous cooling required may be achieved without any insurmountable difficulty by installations that are heavy and complex to implement.

The discovery of so-called "high-temperature" superconducting materials, for example magnesium diboride MgB2, whose superconductivity is obtained at temperatures on the order 30 Kelvin, or other alloys which can have superconductivity at temperatures as high 70 Kelvin, has made it possible to reduce the temperature constraints and simplify the cooling systems of machines using superconducting coils.

The European patent application published under the number EP 1777800 describes an example of an electromechanical machine using a superconducting coil.

In this example, the superconducting coil, located between the rotor and the stator, is enclosed in a cryostat placed inside the machine so that the coil is maintained at a temperature lower than the critical temperature of the material used. No explanation of how the cryostat is maintained at the desired temperature is given.

As is known, the maintenance of such a low temperature is obtained by means of a fluid, for example liquid nitrogen, helium, or liquid hydrogen depending on the critical temperature of the superconducting material used, maintained at the desired temperature by cooling systems.

In a first known method, a reservoir of low-temperature liquefied gas is used as a cold supply and a flow is drawn from this reservoir in order to continuously cool the machine's electrical conductors made of superconducting material before being discharged to the outside of the machine.

In that case it is necessary to provide a sufficient mass of liquefied gas at a cryogenic temperature, storage means for maintaining this gas at its liquefaction temperature, and regulating means for distributing the gas so as to maintain the superconducting elements of the machine at the desired temperature while limiting the consumption of gas to a minimum.

When the machine is onboard a vehicle, in addition to the cumbersome necessity of carrying a sufficient quantity of gas, it is necessary to provide distribution and regulating means whose operation at a cryogenic temperature is more complex than in the case of systems operating at ambient temperature.

In a second known method, a low-temperature fluid circulates in a closed circuit between the parts of the machine to be maintained at a cryogenic temperature and a cryogenic cold-generating device (known as a cryocooler).

Such cryogenic cold-generating devices are known, but they are still heavy and bulky and must be supplied with energy in order to produce the required cold.

In cases where such devices are used, a malfunction of the cooling system generally results in an immediate shutdown of the machine being cooled unless redundant cooling devices are provided.

The known methods are therefore disadvantageous and are unsatisfactory for onboard machines when, in particular, volume, mass, and reliability are essential criteria, such as for example in the case of applications onboard aircraft.

OBJECT AND SUMMARY OF THE INVENTION

The invention provides a solution to these various problems by means of an electromechanical machine comprising at least one part composed of a coil, for example a rotor or stator coil, made from a material that becomes electrically superconducting when its temperature is below a critical temperature Tc, in which electromechanical machine a functional part, for example an electric motor or an electromechanical generator, is contained, in practice entirely contained except for any actuating or power take-off means, in an internal volume of an enclosure that is thermally insulating, fluid-tight, and adapted for receiving a low-temperature fluid, particularly a cryogenic fluid.

In this arrangement, the electromechanical machine benefits, after cooling, from the advantages provided by electrical conductors, particularly coil conductors, which are superconducting without any external means for maintaining the temperature below the critical temperature, using the mass of the functional part as a heat sink.

In one embodiment, the internal volume, given the elements it contains, has a total capacity for storing energy in the form of heat, considered when the temperature in the internal volume changes from the temperature of the cryogenic fluid to a temperature at most equal to the critical temperature Tc, equal to or greater than the quantity of heat Emax introduced into the internal volume as a result of the heat passing through the insulating wall and the heat produced by the functional part due to its operation and its losses, when the electromechanical machine is used for a duration and under operating conditions corresponding to a worst-case uninterrupted mission with respect to said quantity of heat.

Considering the worst-case mission with respect to the thermal criteria considered guarantees that the electromechanical machine remains operational throughout the duration of the mission, no matter what the mission performed, for example by the vehicle using this machine.

In one embodiment, the total capacity of the electromechanical machine for storing energy in the form of heat comprises:
- a capacity for storing thermal energy in static form via accumulation of a quantity of heat in the elements of the functional part of the electromechanical machine between the critical temperature Tc of the superconducting material and the temperature of the cryogenic fluid used;
- a capacity for storing energy via latent heat of vaporization of a quantity of the cryogenic fluid filling the reservoir;

such that the capacity for storing thermal energy in static form plus said capacity for storing energy via a latent heat of vaporization of the cryogenic fluid represents at least the quantity of heat Emax.

Thus, the various heat accumulation capacities are exploited in order to obtain an optimal thermal autonomy of the mechanical machine with a minimal mass penalty in the machine.

In order to achieve the objective with minimal penalties, particularly mass penalties, the materials composing the functional part are advantageously selected from materials having a high specific heat capacity, greater than 400 J/kg ° C. and preferably greater than 800 J/kg ° C., so as to form a heat sink capable of accumulating at least a substantial part of the quantity of heat Emax.

Such materials, selected based on their specific heat capacities, are also selected based on their other requirements (mechanical, electrical, machining, recycling, cost, etc.) so as not to compromise the design of the electromechanical machine.

In order to promote heat exchanges, particularly during a cooling phase, the parts made of materials having a high specific heat capacity are arranged and geometrically configured so as to promote heat exchanges between these materials and the internal volume of the insulating enclosure.

When the quantity of heat that can be stored in the materials with high specific heat capacity is insufficient for the requirements of the worst-case mission, the internal volume of the insulating enclosure comprises at least one reservoir for storing cryogenic fluid in the liquid state when the temperature is lower than the critical temperature Tc, in a way that is non-insulated from the internal volume in terms of heat conduction.

This results in a supply of thermal capacity, the volume of which can be adjusted during the design of the machine, which benefits from the quantity of energy absorbed by the mass of the cryogenic liquid, and from the phase change of the cryogenic liquid filling the reservoir when the temperature of the phase change from the liquid phase to the gas phase is lower than the critical temperature, in order to maintain the temperature in the insulating enclosure below the critical temperature.

In one embodiment, the reservoir is formed by an internal separator determining, between this internal separator and a more external separator of the insulating wall, the volume of the reservoir, and determining on the side of an internal surface a smaller volume in which the functional part is located. In this arrangement, the functional part is located in an open space in the center of the reservoir containing the cryogenic liquid, which facilitates the maintenance of the low temperature.

In order to perform the cooling by circulating cryogenic fluid and to fill the reservoir with cryogenic fluid, the wall of the insulating enclosure comprises openings for connecting the internal volume with the outside of the insulating enclosure, these openings comprising gates or valves for controlling the circulation of fluids through said openings.

In order to access the functional part from outside the enclosure in which it is contained, the wall of the insulating enclosure comprises one or more openings traversed in fluid-tight fashion by at least one shaft for transmitting the mechanical power delivered to or generated by the functional part so as to provide an end of said shaft accessible from outside the insulating enclosure and/or comprises one or more openings traversed by conductive electric cables, for example electric power transmission cables or command and control systems cables.

This prevents heat losses from a circulation of fluid between the inside and the outside of the enclosure while maintaining access to the essential functions of the functional part.

In this case, advantageously, the mechanical transmission shaft or shafts and/or the electric conductors running through the wall of the insulating enclosure, and in general all elements, such as mounts, in contact with the internal volume and with the outside and hence capable of creating thermal bridges unfavorable to the maintenance of the desired temperature conditions in the internal volume, are made from a material having a thermal conductivity of less than 25 W/m ° C.

In order to perform the cooling operations and to monitor the maintenance of the superconductive operating conditions of the electrical parts of the functional part, the electromechanical machine comprises means for controlling and monitoring the temperature of the internal volume and/or the temperature of the coils made of superconducting material, these control and monitoring means comprising at least one temperature sensor attached to the functional part.

The invention relates, in particular, to an aircraft comprising such an electromechanical machine. The aircraft benefits from a reduced mass of the electromechanical machine without any new cold-generating systems being installed in the aircraft.

In an advantageous embodiment, the invention relates to a vehicle comprising such an electromechanical machine used as a propulsion engine of the vehicle.

The invention also relates to a method for implementing such an electromechanical machine, which method comprises the following steps:
- connecting, when the machine is in a static position, an external cooling system capable of delivering a fluid at a cryogenic temperature lower than the critical temperature Tc to one or more openings running through the wall of the insulating enclosure;
- filling at least one volume and/or reservoir inside the insulating enclosure with the fluid at cryogenic temperature;
- when the temperature of the functional part is stabilized at the cryogenic temperature, disconnecting the external cooling system.

According to one embodiment of the implementation method, a smaller volume of the internal volume of the insulating enclosure in which the functional part is comprised is filled with cryogenic fluid, immersing this functional part as long as the temperature of this functional part is not stabilized at the cryogenic temperature, and wherein the smaller volume is then purged of the cryogenic fluid it contains. The part that stores heat due to its specific heat capacity is thus efficiently and quickly cooled, which is important in the case where successive missions must be performed by a vehicle with the electromechanical machine on board.

Furthermore, when the electromechanical machine comprises a reservoir inside the insulating enclosure, the reservoir is filled with cryogenic fluid prior to the disconnection of the external cooling system. The capacity to maintain the temperature condition is thus improved.

In order to produce a suitable electromechanical machine, a method for designing the machine comprises:
- a step for determining a worst-case mission in terms of energy supplied in the form of heat inside the volume of the insulating enclosure and for calculating the maximum energy Emax that may be supplied in the form of heat during said mission;
- a step for determining a capacity for storing thermal energy in static form by accumulation in the elements of the functional part of the electromechanical machine, taking into consideration the critical temperature Tc of the superconducting material and the temperature of the cryogenic fluid used, and for optimizing the internal design of the active part so as to maximize said storage capacity;
- a step for determining a volume of a reservoir such that a latent heat of vaporization of the cryogenic fluid initially filling said reservoir represents at least the thermal energy required in addition to the capacity for storing thermal energy in static form in order to reach the value Emax.

BRIEF DESCRIPTION OF THE DRAWINGS

The present invention is described in reference to the figures which, in a non-limiting way, schematically represent.

DETAILED DESCRIPTION OF THE EMBODIMENTS

The various components and elements of the electromechanical machine are not shown to scale.

Figure 1:
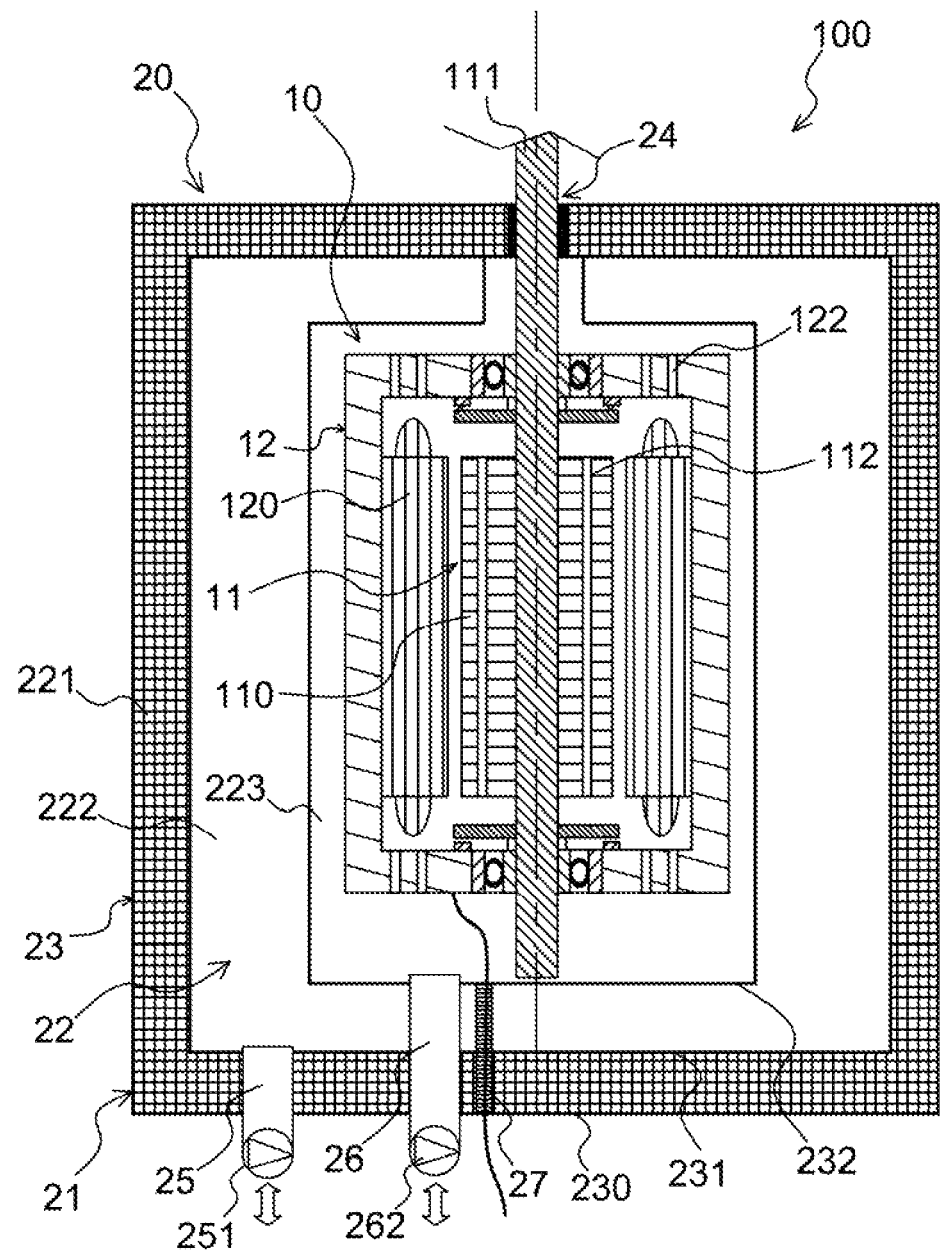
FIG. 1: a schematic sectional view of an electromechanical machine according to the invention.

In FIG. 1, the accessory elements, mounts, electrical cables, sensors, etc., are not shown.

The electromechanical machine 100, schematically illustrated in FIG. 1, comprises a functional part 10 and comprises a thermal control system 20 for regulating a temperature of said functional part.

The functional part 10 performs the expected functions of the electromechanical machine 100, typically the functions of an electric motor and/or of an electric generator, in this case comprising a rotor 11.

In its general principals and its structure, the functional part 10 is similar to that of the known electromechanical machines comprising a moving part, in this case a rotor 11, and a stator 12. It also comprises, in a known way, magnetic parts, for example magnets and/or parts made of magnetic materials, and comprises at least one electrical conductor, for example a coil made with an electrically conductive material.

In the example illustrated in FIG. 1, a person skilled in the art will recognize a rotary machine, electric motor, or electric generator comprising stator coils 120 and rotor coils 110.

This example is non-limiting, since any electromechanical machine comprising coils for creating magnetic fields may be used in the context of the present invention.

The electrically conductive materials, in the case of the electromechanical machine 100, are superconducting materials whose electrical resistance becomes zero at a temperature below a critical temperature Tc characteristic of the material used.

The superconducting material is for example a high-temperature superconducting material whose critical temperature is greater than or equal to the cryogenic vaporization temperature of a gas (at ordinary temperature) such as liquid diatomic nitrogen, 77 Kelvin at ordinary ambient pressure, liquid diatomic hydrogen, 20 Kelvin at ordinary ambient pressure, or liquid helium, about 4 Kelvin at ordinary ambient pressure.

Furthermore, non-electric parts of the functional part 10, for example a magnetic mass of the rotor 11 or a cage of the stator 12, are made to create an accumulating heat sink with a desired capacity, the functions of which will be described below.

Accordingly, the materials used to produce said non-electric parts are chosen, within the limits required for their mechanical properties, so as to have the highest possible specific heat capacities Cp.

For example, the non-electric parts are made by incorporating ferrous materials (Cp of iron=460 J/Kg ° C.), aluminum (Cp of aluminum=890 J/Kg ° C.), boron (Cp=1300 J/Kg ° C.) or beryllium (Cp=1800 J/Kg ° C.).

Firstly, these materials, or other materials having high specific heat capacities, are preferable to the polymer materials often used in electric motors and generators, and secondly, a sufficient mass of these materials must be incorporated in order to obtain the desired heat accumulation capacity.

Such a result, which in theory is easy to obtain in the case of electromechanical machines that are high-powered, and hence of high mass, can also be achieved or approximated by incorporating into the internal volume 22 of the insulating enclosure 21 accessories such as reducers or mechanical motion converters which, due to the amounts of power to be transmitted by these reducers or converters, generally represent a mass of materials capable of accumulating energy in the form of heat that is sizeable relative to the mass of the electromechanical machine 100.

The result of these constraints is that the architectural and design criteria taken into consideration by the person skilled in the art of electromechanical machine design are different in this case from those considered in ordinary design rules.

The thermal control system 20 primarily comprises an insulating enclosure 21 for thermally insulating the functional part 10, a device for cooling an internal volume 22 of the insulating enclosure 21 and a system for controlling and monitoring the temperature in said insulating enclosure.

The insulating enclosure 21 is primarily formed by a wall 23 surrounding the internal volume 22.

This wall 23 is made to limit the flow of heat between the internal volume 22 of the insulating enclosure, at low temperature, for example at a temperature below 100 Kelvin, and a space outside the insulating enclosure which may be at temperatures on the order 400 Kelvin, or even higher in certain environments.

This type of insulating enclosure is known, particularly in the field of cryostats or Dewar vases.

In a known way, the wall 23 most often comprises several separators 230, 231, 232 apart from each other and delimiting spaces between them. The spaces between the separators determine separation volumes 221, 222.

The most external separation volume 221, in which a partial gas gap is produced and/or which contains a thermal insulator, for example a silica aerogel, provides a first insulation.

Openings 24, 25, 26, 27 of the wall, which are necessarily present in the wall, are fluid-tight so as to limit, as much as possible, the fluid exchanges between the inside of the insulating enclosure 21 and the outside.

Such openings are disposed so as to provide access to parts inside said insulating enclosure from outside said insulating enclosure.

In the case of the exemplary embodiment illustrated in FIG. 1, at least one mechanical power transmission shaft 111, for example connected to rotating parts of the electromechanical machine 100, runs through the insulating wall along with a bundle of electrical cables.

In one embodiment, not shown, the electromechanical machine does not comprise a shaft running through the wall, and a mechanical transmission shaft entirely outside the insulating enclosure is driven in motion by a magnetic coupling with internal moving parts of the functional part inside the insulating enclosure.

Preferably, all of the elements running through the wall 23 of the insulating enclosure and the separators 230, 231, 232 are made of materials chosen for their poor heat-conducting properties.

The concept of poor heat-conducting materials is relative in this case insofar as functional criteria, for example mechanical strength for a shaft 111 of the electromechanical machine or electrical conductivity for a power supply cable or measurement sensor, must necessarily be taken into consideration.

For example, a mechanical shaft is made from a titanium alloy whose thermal conductivity of around 20 W/m ° C. is lower than that of ordinary steel, which has a thermal conductivity at least twice as high, while having good mechanical strength, or an electrical cable, at least in its part running through the wall of the insulating enclosure, is made from an iron-nickel alloy with 36% nickel (such as Invar®), which is also a poor heat conductor, for a metal, with a thermal conductivity of 13 W/m ° C., and whose electrical resistivity, although nearly five times that of copper, is not disadvantageous in a short length of cable.

Other materials can be used as long as they have similar or better characteristics in terms of poor thermal conductivity, such as polymer matrix composites.

The thermal control system 20 also comprises a heat exchanger incorporated into the insulating enclosure.

The concept of a heat exchanger in this case should be considered in a broad sense. The heat exchanger in this case incorporates a set of elements and features of embodiment distributed throughout the electromechanical machine 100 which promote the transfer of heat between the various elements in said electromechanical machine.

The heat exchanger comprises, in particular, openings 25, 26 disposed in the wall 23 of the insulating enclosure so as to enable the circulation of a fluid between the inside of said insulating enclosure and the outside, both in the direction of a filling of the internal volumes of said insulating enclosure and in the direction of the drainage of said volumes. Said openings are provided with sealing devices 251, 261, either controlled gate-type devices, or automatic valve-type devices. The passages 25, 26 and the sealing devices are made to limit the heat exchanges between the inside of the insulating enclosure and the outside, as mentioned above, particularly by using poor heat-conducting materials to produce them.

In one embodiment, the heat exchanger makes use of geometric characteristics of the non-electric parts, made of materials chosen for their heat-accumulation properties, of the functional part 10 that promote heat exchanges inside the insulating enclosure 21.

Such geometric characteristics consist for example in bores 112, 122 running through the non-electric parts so that a surface area of said non-electric parts in contact with the surrounding fluid is increased so as to promote heat exchanges.

In one embodiment, an internal separator 232 encloses the functional part 10 in fluid-tight fashion inside a smaller volume 223 of the insulating enclosure 21.

The wall of the internal separator 232 determines, with a more external separator 231 of the wall 23 of the insulating enclosure, a reservoir 222 surrounding the smaller volume 223 in which the functional part 10 is located. In this case, the internal separator 232 does not have any particular thermal insulation properties, since as much thermal transparency as possible is sought. The internal separator 232 is for example made of aluminum alloy.

In this case, using a reservoir 222, at least one filling and/or drainage opening 25 connects to said reservoir, and said at least one opening, or at least one other opening connecting to said reservoir, is provided with a device, not shown, for regulating the pressure inside the reservoir 222 so as to evacuate a fluid located inside it with a pressure higher than a set pressure.

In this case, according to an embodiment illustrated in FIG. 1, at least one filling and/or drainage opening 26 runs in fluid-tight fashion through the volume of the reservoir 222 and the separators 230, 231, 232 of the insulating wall 23 so as to connect to the smaller volume 223.

The thermal control system 20 also comprises the gates or valves, measurement sensors, and electrical cables, not shown, necessary or useful to the operation and monitoring of said thermal control system and of the temperature of the functional part 10 of the electromechanical machine 100. As indicated above, all of the passages in the walls are fluid-tight and if necessary, thermally insulated.

In a non-illustrated embodiment, the opening that connects to the reservoir 222 and is provided with a pressure regulating device also connects to the smaller volume 223. The cryogenic fluid released by the reservoir 222 is thus injected into the smaller volume 223 that encloses the functional part 10, which is cooled before said fluid itself is evacuated through an opening 26 of the insulating wall 23 connecting to said smaller volume.

Figure 2:
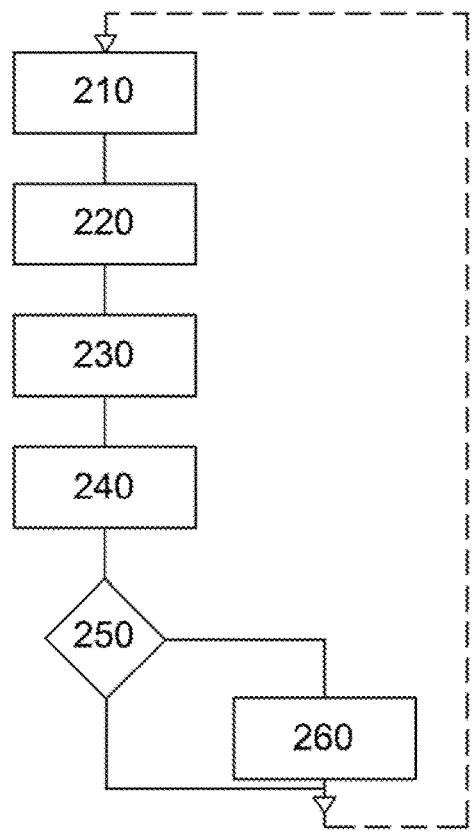
FIG. 2: a block diagram of the method for designing the electromechanical machine of the invention.
Figure 3:
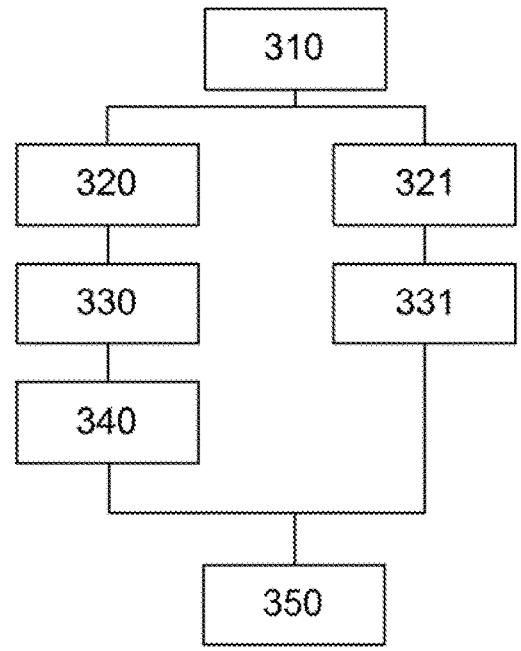
FIG. 3: a block diagram of a method for cooling the machine of the invention for purposes of a mission.

The electromechanical machine 100 and its structure, particularly the way in which its structural elements must be designed and produced, will be more clearly understood in the description of the principles implemented in an exemplary design, FIG. 2, of such an electromechanical machine and in the description of the operational implementation, FIG. 3, of such an electromechanical machine, which will be described in the context of an electromechanical machine of the electric generator type onboard an aircraft.

In addition to the performance customarily expected of an electromechanical machine intended for a specific use, a person skilled in the art in charge of designing an electromechanical machine implementing the principles of the invention will establish, in a first phase 210, in accordance with the various potential missions for the aircraft, the maximum duration of continuous operation of the electromechanical generator.

This maximum duration of continuous operation is, in practice, the maximum possible duration of a mission of the aircraft, including reserves, which is known, for example 6 hours of mission, and takes into account a safety coefficient, for example 20%, or 7.2 hours of continuous operation.

Based on the available technologies in the field of superconducting materials, the person skilled in the art will then, in a second phase 220, determine the maximum temperature Tmax that the electric generator must not exceed during the maximum duration of the mission including the margin, 7.2 hours in the example, in order to remain operational throughout the mission.

This temperature is for example 75 Kelvin, for a high-temperature superconducting material having a critical temperature Tc at least slightly higher than that value.

In a third phase 230, the quantity of energy in the form of heat that will be supplied to the electromechanical machine during the previously established duration is determined.

This thermal balance takes into account a flow of heat from the outside which will reheat the functional part 10, which flow of heat is a function of the performance of the thermal insulation provided by the insulating enclosure 21, an exterior temperature, and the temperature actually maintained in said insulating enclosure.

This thermal balance also takes into account the heat generated by the functional part 10 inside the insulating enclosure 21. In essence, even though the electrically conductive elements are superconducting under the temperature conditions maintained in said insulating enclosure, the operation of the electromechanical machine 100 dissipates internal energy in the form of hysteresis losses in the magnetic parts, creating a heat supply, which will be determined for a worst-case mission profile based on the criteria of said heat supply.

The maximum amount of energy Emax (Joule) that the electromechanical machine will receive in the event of the worst-case mission is then deduced from the thermal balance.

In a fourth phase 240, taking into account an initial temperature Tmin, for example the temperature of liquid nitrogen at ambient atmospheric pressure at ground level, inside the insulating enclosure 21, and the maximum admissible temperature Tmax, a total static heat capacity CCs (Joule/° C.) of the elements inside the insulating enclosure, i.e. apart from material phase changes, is determined.

It will be noted that the total static heat capacity CCs in this case is primarily supplied by structures of the functional part 10.

It is possible, by adapting the static heat capacity CCs via adjustments in the dimensions of the elements of the functional part 10, for the electromechanical machine 100 to be capable of performing the mission without having its internal temperature exceed the maximum temperature Tmax, if:

$$CCs \times (Tmax - Tmin) >= Emax$$

It is then verified in step 250 whether or not this condition is fulfilled.

If this condition is fulfilled, the electromechanical machine 100 will, in theory, have only one way to maintain cold, via a static accumulation of cold, and the essential features of the electromechanical machine, for the thermal control functions, are defined in this phase.

If this condition is not fulfilled, the quantity of cryogenic liquid which must be eliminated in order to compensate for the difference between Emax and the term CCs×(Tmax−Tmin), firstly by raising the temperature of said cryogenic liquid to a boiling point and secondly via the change of said cryogenic liquid from the liquid phase to the vapor phase, will be determined in a fifth phase 260. The cryogenic liquid in this case is chosen so as to have a boiling point lower than the critical temperature Tc.

In the case of liquid nitrogen at the atmospheric pressure of 101325 pa, the latent heat of vaporization is around 200 kJ/kg.

The quantity of cryogenic liquid required in this case will determine the volume of the reservoir 222.

It is clear that the design cycle just described in simplified fashion will be conducted by the person skilled in the art in a series of iterations, given that the thermal design process is not analytical and requires that intermediate results be applied to the initial hypotheses in order to converge on a final result.

Despite the complexity introduced by the need to maintain the functional part 10 at a low temperature, the electromechanical machine 100 is lighter and of smaller dimensions than a conventional electromechanical machine with the same electrical and/or mechanical performance, particularly due to the use of coils made of superconducting materials, which enables currents to pass through the wires of the coils without overheating.

Furthermore, the thermal control system 20 that maintains the conductive elements at the cryogenic temperature is totally static.

When applied to the functional part 10 as a whole, the thermal control system 20 is much simpler, lighter, and more reliable than in the known cryogenic systems for cooling the electrically conductive parts.

This result is obtained by means of a specific implementation of the electromechanical machine 100.

When the electromechanical machine 100 must be used, it is cooled prior to performing the mission, for example of the aircraft in which it is installed.

In a first step 310, a source of cryogenic liquid, for example liquid nitrogen at the temperature of 77 Kelvin or less, for an external cooling system is connected to a filling opening 25, 26 of the insulating enclosure, and if necessary, a cryogenic liquid recovery unit is connected to a drainage opening. In the case where the insulating enclosure 21 comprises a smaller volume 223, the openings 26 connecting to said smaller volume are connected first 320.

In a second step 330, cryogenic liquid is delivered through the filling opening into the smaller volume 223, or into the internal volume of the insulating enclosure 21 if it does not include a smaller volume, in order to fill said smaller volume, or said internal volume, and to immerse the functional part 10 located inside it. During this second step, the quantity of cryogenic liquid is continuously adjusted, as necessary, in order to compensate for an evaporation of said cryogenic liquid.

It will be noted that in this second step, the geometric shapes chosen for the elements of the functional part 10 used as a heat sink will provide an increased surface area of contact between said elements and the cryogenic liquid, which has the effect of accelerating the temperature adjustment of said functional part.

When the temperature of the functional part 10 is lowered and stabilized at the temperature of the cryogenic liquid, which is for example monitored by temperature sensors permanently installed in the intermediate enclosure, which sensors are connected during this step to the cooling system, the cryogenic liquid is drained 340 out of the intermediate enclosure which, if necessary, is emptied without having its temperature increased by this operation.

In a third step 321 when the internal volume 22 of the insulating enclosure 21 includes a smaller volume 223, which can be performed simultaneously with the step 320, the source of cryogenic liquid, for example liquid nitrogen at the temperature of 77 Kelvin or less, the external cooling system is connected to a filling opening of the insulating enclosure, and if necessary, a cryogenic liquid recovery unit is connected to a drainage opening, for the openings 25 connecting to the reservoir 222.

In a fourth step 331 the reservoir 222 is filled with cryogenic liquid.

Preferably, the external cooling system is kept connected so as to maintain the cryogenic liquid at a desired level as long as possible, and is not disconnected until just prior to the start of the mission.

It should be noted that the presence of the reservoir 222 surrounding the smaller volume 223, in which the previously or simultaneously cooled functional part 10 is located, ensures that said smaller volume and the functional part 10 are maintained at the temperature of the cryogenic liquid until the start of the mission.

When the external cooling device is disconnected 350, the electromechanical machine 100 becomes autonomous in terms of controlling its temperature and capable of maintaining the internal temperature in the insulating enclosure 21 below the critical temperature Tc for a maximum duration corresponding to the capacity for storing cold defined during the design of said electromechanical machine.

As the mission progresses, the heat produced by the functional part 10, minimized by the use of superconductors, and that derived from the flow of heat linked to the temperature difference between the inside and the outside of the insulating enclosure 21 cause the temperature inside the enclosure to increase to the boiling temperature of the cryogenic liquid, after which the temperature is held constant at said boiling temperature during an evaporation phase of the cryogenic liquid, and finally, the temperature gradually increases from the boiling temperature to the ambient temperature. The projected maximum operating temperature must not be reached during the mission. The vapors caused by the boiling of the cryogenic liquid are evacuated by the pressure regulating device.

When the mission has ended, the electromechanical machine 100 is again cooled and/or the quantity of cryogenic liquid is topped off for a new mission.

Advantageously, when a vehicle, for example an aircraft, comprises a plurality of electrical machines of the invention, said vehicle includes a cryogenic fluid distribution system to which the external cooling device is connected, and a centralized monitoring of the temperatures of the various electric machines connected to this system is also performed.

It is clear from the provided examples of the production, design, and use of an electromechanical machine according to the invention that it is subject to variants while remaining within the general principles of the invention.

In particular, the structure of the insulating enclosure, the shape and arrangement of a cryogenic reservoir incorporated into the insulating enclosure, the cooling and cryogenic liquid filling means, and the control and monitoring devices may take various forms while performing the same functions as those described.

Likewise, there may be any number of cryogenic coils of the functional part, or any number of mechanical parts independent of the functional part, in the same insulating enclosure.

The person skilled in the art will also be capable of selecting materials and parameters such as the type and temperature of the cryogenic fluid based on the specific requirements specific of the individual case. This, the cryogenic fluid may be nitrogen, hydrogen, or helium depending on the requirements linked to the critical temperature of the superconducting material used.

This results in an electromechanical machine 100 that benefits from the advantages of superconducting materials without the disadvantage of complex cooling units, thanks to a cold-containment enclosure containing the entire functional part 10 of said electromechanical machine used as a heat sink, and to the transfer of the complex cold-production means to offboard systems.

Such a machine is for example an electric generator whose shaft 111 for driving the moving parts is connected to an external mechanical power source of a propulsion engine or a gas generator of an auxiliary power unit.

Such a machine is for example an electric motor of an actuator or an electric propulsion engine of a vehicle.

The invention claimed is:

1. Electromechanical machine comprising at least one part composed of a coil made from a material that becomes electrically superconducting when its temperature is below a critical temperature; a functional part of the electromechanical machine contained in an internal volume delimited by a wall of a thermally insulating and fluid-tight enclosure; and wherein the internal volume has a total capacity for storing energy in the form of heat, in response to a temperature change in the internal volume from a temperature of a cryogenic fluid to a temperature at most equal to the critical temperature, equal to or greater than a quantity of heat Emax introduced into the internal volume after the electromechanical machine is used for a predetermined duration and under operating conditions corresponding to an uninterrupted mission previously established as a worse-case mission with respect to the quantity of heat Emax.

2. Electromechanical machine according to claim 1, wherein the total capacity for storing energy in the form of heat comprises:
   a capacity for storing thermal energy in static form via accumulation of a quantity of heat in elements of the functional part of the electromechanical machine between the critical temperature of the superconducting material and the temperature of the cryogenic fluid used;
   a capacity for storing energy via a latent heat of vaporization of a quantity of the cryogenic fluid filling a reservoir; and
   the capacity for storing thermal energy in static form plus the capacity for storing energy via latent heat of vaporization of the cryogenic fluid representing at least the quantity of heat Emax.

3. Electromechanical machine according to claim 1, wherein materials composing the functional part are selected from materials having a high heat capacity, greater than 400 J/kg ° C., to form a heat sink accumulating at least a substantial part of the quantity of heat Emax.

4. Electromechanical machine according to claim 1, wherein the materials composing the functional part are selected from materials having a high heat capacity, greater than 800 J/kg ° C., to form a heat sink accumulating at least a substantial part of the quantity of heat Emax.

5. Electromechanical machine according to claim 3, wherein the materials having the high heat capacity are arranged and geometrically configured to promote heat exchanges between the materials and the internal volume.

6. Electromechanical machine according to claim 1, wherein the internal volume comprises a reservoir to store a cryogenic fluid in a liquid state, for a temperature lower than the critical temperature, that is non-insulated from the internal volume in terms of heat conduction.

7. Electromechanical machine according to claim 6, wherein the reservoir is formed by an internal separator determining, between the internal separator and an external separator of the wall, a volume of the reservoir, and determining, on a side of an internal surface, a smaller volume in which the functional part is located.

8. Electromechanical machine according to claim 1, wherein the wall of the thermally insulating and fluid-tight enclosure comprises openings to connect the internal volume with outside of the thermally insulating and fluid-tight enclosure, the openings comprising gates or valves to control a circulation of fluids through the openings.

9. Electromechanical machine according to claim 1, wherein the wall of the thermally insulating and fluid-tight enclosure comprises openings traversed in a fluid-tight fashion by at least one shaft to transmit mechanical power between the functional part located in the internal volume and a space outside the thermally insulating and fluid-tight enclosure.

10. Electromechanical machine according to claim 9, wherein said at least one mechanical shaft is made from a material having a thermal conductivity less than 25 W/m ° C.

11. Electromechanical machine according to claim 1, wherein the wall of the thermally insulating and fluid-tight enclosure comprises openings traversed in a fluid-tight fashion by conductive electric cables.

12. Electromechanical machine according to claim 11, wherein the conductive electric cables running through the wall of the thermally insulating and fluid-tight enclosure are made from a material having a thermal conductivity less than 25 W/m ° C.

13. Electromechanical machine according to claim 1, further comprising a control device to control and monitor a temperature of at least one of the internal volume and the coils made of the superconducting material, the control device comprising at least one temperature sensor attached to the functional part.

14. Aircraft comprising the electromechanical machine of claim 1.

15. Vehicle comprising the electromechanical machine of claim 1, the electromechanical machine being used as a propulsion engine of the vehicle.

* * * * *